(12) United States Patent
Kirk

(10) Patent No.: US 7,028,776 B2
(45) Date of Patent: Apr. 18, 2006

(54) METHODS FOR THE INHIBITION OF SALT BLOCKAGES IN OIL AND GAS WELLS

(75) Inventor: Joseph W. Kirk, The Woodlands, TX (US)

(73) Assignee: BJ Services Company, Houston, TX (US)

( * ) Notice: Subject to any disclaimer, the term of this patent is extended or adjusted under 35 U.S.C. 154(b) by 45 days.

(21) Appl. No.: 10/249,069

(22) Filed: Mar. 13, 2003

(65) Prior Publication Data
US 2003/0173087 A1    Sep. 18, 2003

Related U.S. Application Data

(60) Provisional application No. 60/364,319, filed on Mar. 13, 2002.

(51) Int. Cl.
*E21B 37/00* (2006.01)
*E21B 43/25* (2006.01)

(52) U.S. Cl. ............ 166/309; 166/310; 166/312; 166/371; 507/244; 507/259; 507/266; 507/927

(58) Field of Classification Search ............ 166/308.6, 166/309, 310, 371, 250.01, 311, 312; 507/241, 507/259, 266, 202, 244, 927, 928
See application file for complete search history.

(56) References Cited

U.S. PATENT DOCUMENTS

| | | | | |
|---|---|---|---|---|
| 3,073,387 A | * | 1/1963 | Dunning et al. | 166/267 |
| 3,155,178 A | * | 11/1964 | Kirkpatrick et al. | 175/69 |
| 3,213,018 A | | 10/1965 | Roland et al. | |
| 3,367,416 A | | 2/1968 | Ralston et al. | |
| 3,486,560 A | * | 12/1969 | Hutchison et al. | 166/292 |
| 3,544,461 A | | 12/1970 | Boone et al. | |
| 3,913,678 A | * | 10/1975 | Blount et al. | 166/310 |
| 4,796,702 A | * | 1/1989 | Scherubel | 166/308.6 |
| 4,804,484 A | * | 2/1989 | Dadgar | 507/244 |
| 5,203,834 A | * | 4/1993 | Hutchins et al. | 166/270 |
| 5,310,002 A | * | 5/1994 | Blauch et al. | 166/307 |
| 5,385,206 A | * | 1/1995 | Thomas | 166/267 |
| 5,396,958 A | | 3/1995 | Zaid | |

OTHER PUBLICATIONS

SPE 10097; "Use of Chemical Salt Precipitation Inhibitors to Maintain Supersaturated Salt Muds for Drilling Salt Formations;" S.L. Earl, J.J. Nahm; *Society of Petroleum Engineers of AIME*; 1961.
SPE 13246; "An Unusual Case of Salt Plugging in a High-Pressure Sour Gas Well;" M.C. Place Jr. and J.T. Smith; *Society of Petroleum Engineers of AIME*; 1964.

* cited by examiner

*Primary Examiner*—George Suchfield
(74) *Attorney, Agent, or Firm*—Howrey LLP

(57) ABSTRACT

Compositions and methods for the inhibition of salt formation in oil and gas wells are disclosed. In particular, nitrilotriacetamide and its salts are effective at treating existing salt formations, and in inhibiting formation of new deposits.

14 Claims, 3 Drawing Sheets

METHODS FOR THE INHIBITION OF SALT BLOCKAGES IN OIL AND GAS WELLS

CROSS REFERENCE TO RELATED APPLICATIONS

The present application claims priority to U.S. Provisional Patent Application Serial No. 60/364,319 filed Mar. 13, 2002, the contents of which are incorporated herein by reference.

BACKGROUND OF INVENTION

1. Field of the Invention

The invention relates to methods for the minimization or prevention of the formation of salt deposits in oil and gas wells. In particular, the use of nitrilotriacetamide in treating wells is disclosed.

2. Description of Related Art

Wells drilled to produce petroleum or gas products typically also produce brine water. The water is often near or at sodium chloride saturation levels. During handling of the water, salt crystals often form, producing a "salt block" in the well and/or flowlines. This block is typically formed by either temperature cooling of the water, or by concentration of the brine downhole as produced gas gradually strips water vapor leaving salt behind as an increasingly concentrated solution.

Salt blocks and deposits have historically been treated by circulation of fresh water into the well. While usually effective at dissolving the salt, this treatment can be expensive, inconvenient, and delays production. Water may not be readily accessible at the drilling site, and it may be necessary to transport it over potentially long distances. During water treatment, the production of the well is significantly reduced or stopped completely.

Salt inhibitors typically function by binding to the surfaces of salt crystals, preventing further growth of the crystal. This effectively increases the solubility of the salt in solution, as it is incapable of precipitating. Other mechanisms of action may be possible, resulting in an increased solubility of salt in solution. Various salt inhibitors have been discussed in the engineering literature.

SPE 10097 (Society of Petroleum Engineers of AIME, Oct. 5–7, 1961) describes the evaluation of five commercially available salt inhibitors. Laboratory assays were performed to determine effectiveness in maintaining salt saturation at downhole temperatures. Tests were also performed in a Williston Basin drilling program. The chemical compositions of the inhibitors were not disclosed.

U.S. Pat. No. 3,213,018 (issued Oct. 19, 1965) suggested the use of iron or cobalt salts as a method to inhibit deposition of sodium chloride from saturated solutions. A field trial using sodium ferrocyanide in an oil well was reported.

U.S. Pat. No. 3,367,416 (issued Feb. 6, 1968) offered the use of nitrilotriacetamide or its acid salts to reduce deposition of sodium chloride from supersaturated solutions undergoing reductions in temperature. A field trial was reported, with the addition of 150 ppm of the hydrochloric acid salt of nitrilotriacetamide to an oil well resulted in the almost complete inhibition of salt deposition.

Nitrilotriacetamide was suggested as being useful for stabilizing drilling mud in U.S. Pat. No. 3,544,461 (issued Dec. 1, 1970). Drilling mud is pumped during drilling to remove cuttings and other particulates from around the drill bit. Nitrilotriacetamide was added to sodium chloride saturated drilling mud in order to prevent deposition of solid sodium chloride on filters and equipment. The drilling mud maintains a condition of sodium chloride supersaturation, thereby reducing the tendency of the mud to dissolve salt from the formation contiguous to the well bore. This reduces the amount of mud required for use during the drilling job.

U.S. Pat. No. 5,396,958 (issued Mar. 14, 1995) proposed mud additive compositions and methods for their use to control hole enlargement due to salt bed erosion during drilling, and to assist in solubilization of deposited salt during well operations. The compositions contain sodium or potassium ferrocyanide, and trisodium nitrilotriacetic acid or alkali metal citrates.

Due to the problems associated with downhole salt deposit formation, there exists a need for treatment methods which do not significantly reduce production and are more convenient and cost effective than the currently employed methods.

SUMMARY OF INVENTION

Treating a wellbore and/or downhole formation with a sodium chloride salt block inhibitor reduces or eliminates formation of salt deposits. Addition of the inhibitor to fracturing fluids allows for placement of the inhibitor in the formation. A presently preferred inhibitor is nitrilotriacetamide and salts thereof. Addition of a foaming agent to well fluids facilitates removal of water from the well while reducing or minimizing precipitation of salts.

BRIEF DESCRIPTION OF DRAWINGS

The following figures form part of the present specification and are included to further demonstrate certain aspects of the present invention. The invention may be better understood by reference to one or more of these figures in combination with the detailed description of specific embodiments presented herein.

DETAILED DESCRIPTION

Figure 1:
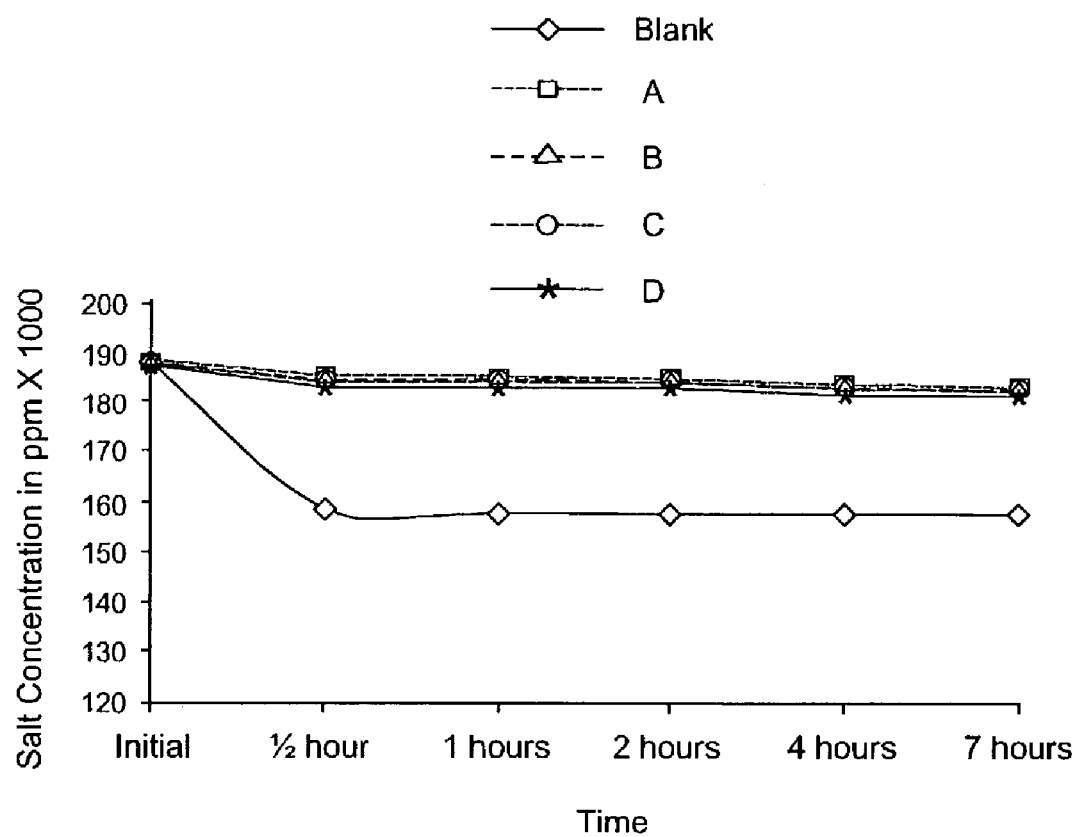
FIG. 1 shows salt remaining in solution due to presence of an inhibitor.

One embodiment of the invention is directed towards fluids suitable for treatment of a wellbore. The fluids generally comprise water and a salt inhibitor. The inhibitor can generally be any chemical which raises the sodium chloride saturation level of a solution. In a presently preferred embodiment, the fluids can generally comprise water and a salt inhibitor selected from the group consisting of nitrilotriacetamide ($N(CH_2CONH_2)_3$) and a nitrilotriacetamide salt. The nitrilotriacetamide salt can generally be any salt, and preferably is a hydrochloric acid salt or a sulfuric acid salt. Other nitrilotriacetamide salts include the citric acid salt, the phosphoric acid salt, and the oxalic acid salt. These salts are examples of currently commercially available inhibitors (sold by e.g., Clearwater, Inc., Houston, Tex.). The fluid can further comprise a foaming agent. The foaming agent can generally be any foaming agent. Presently preferred foaming agents include BJ Unichem RNB-08126, nonyl phenol ethoxylates, sulfamic acid derivatives of ethoxylated alcohols, ammonium dodecylbenzenesulfonate, or potassium dodecylbenzenesulfonate. The concentration of the inhibitor can generally be any concentration sufficient to control or prevent formation of salt deposits. Presently preferred concentrations are about 40 ppm to about 400 ppm. Specific concentrations include about 50 ppm, about 100 ppm, about 150 ppm, about 200 ppm, about 250 ppm, about 300 ppm, about 350 ppm, and about 400 ppm, and ranges between any two of these values. The fluid can further comprise a surfactant and/or a proppant, or other commonly used commercial materials. The fluid can further comprise non-aqueous solvents such as methanol or ethanol.

The above described fluids can be used in hydraulic fracturing operations. One method for improving or maximizing the flow of fluids to a drilled well is to connect the many pre-existing fractures and flow pathways in the reservoir rock with a larger created fracture. A fracturing fluid is pumped into a drilled well at high pressure for a limited duration of time. The pressure exceeds the rock strength, and opens a fracture in the rock. The presence of a proppant can reduce or eliminate collapse of the fracture after release of the pressure. The fluid travels back through the fracture, into the well, and is removed to the surface.

One embodiment of the invention relates to a method for the treatment of a wellbore, the method comprising adding to the wellbore any of the above described fluids. Preferably, the salt inhibitor is adsorbed onto the rock in the formation, thereby allowing a sustained release of inhibitor into produced fluids over a period of time.

The concentration of the inhibitor can be maintained at a single concentration, or can be varied during use. For example, higher concentrations of inhibitor may be desirable during dilution of existing salt deposits than during subsequent inhibition treatments. The aqueous inhibitor solution can be added as a single bolus dose, in regularly spaced additions, or as a continuous addition. The addition can comprise addition of fluid into the wellbore with a production slipstream or addition of fluid into the wellbore using a capillary treating string.

An alternative embodiment of the invention relates to a method for the treatment of a wellbore, the method comprising treating a wellbore with water, and subsequently adding an aqueous solution of a salt inhibitor to the wellbore. This method can be desirable, for example, when solid sodium chloride deposits have already formed in the wellbore.

The release of gas in a gas well gradually strips water present in the well. This, in turn, increases the concentration of salt dissolved in the water. At a sufficiently high concentration, the salt will precipitate. The addition of a fluid containing a salt inhibitor to a gas well will increase the concentration at which the salt would precipitate, thereby extending the amount of time that gas can be produced without interference from the formation of salt crystals.

The addition of a foaming agent to the fluid containing a salt inhibitor can be attractive in various situations. For example, the foaming agent can assist in the removal of water from a gas well without the associated risk of increasing precipitation of salt crystals, as discussed in the previous paragraph.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLE 1

Salt Crystallization

A saturated sodium chloride solution (298 grams sodium chloride and 800 milliliters deionized water) and a solution containing calcium chloride and sodium chloride (201.28 grams calcium chloride dihydrate, 32 grams sodium chloride, and 351 milliliters deionized water) were prepared. A volume of 59 milliliters of the sodium chloride solution and 23.4 milliliters of the calcium chloride brine were combined. This results in a relatively large supersaturation essentially instantly upon mixing.

The effectiveness of four commonly used inhibitor types was investigated. An inorganic salt (as described in U.S. Pat. No. 5,396,958), two polymers (obtained from Clearwater, Inc.), and an organic oligomer (aspartic acid polymer obtained from Donlar Corporation, Bedford Park, Ill.) were evaluated at 250 ppm concentrations. After crystallization, the amount of salt remaining in solution was determined over time (FIG. 1). In the figure, Inhibitor A is DeSalt (JACAM Chemicals LLC; Sterling, Kans.), Inhibitor B is NA Minus 55 (Clearwater, Inc.; Houston, Tex.), Inhibitor C is NA Minus 55 (3801 experimental variation of NA Minus 55; Clearwater, Inc.; Houston, Tex.), and Inhibitor D is an experimental salt inhibitor (Donlar Corporation; Bedford Park, Ill.).

The solutions were initially at 200° F. (93° C.), and were allowed to cool to room temperature (72° F., 22° C.) over time. The data showed an increase in the amount of salt remaining in solution due to the presence of an inhibitor as compared to a blank sample containing salt but lacking inhibitor.

EXAMPLE 2

Crystal Nucleation

Figure 2:
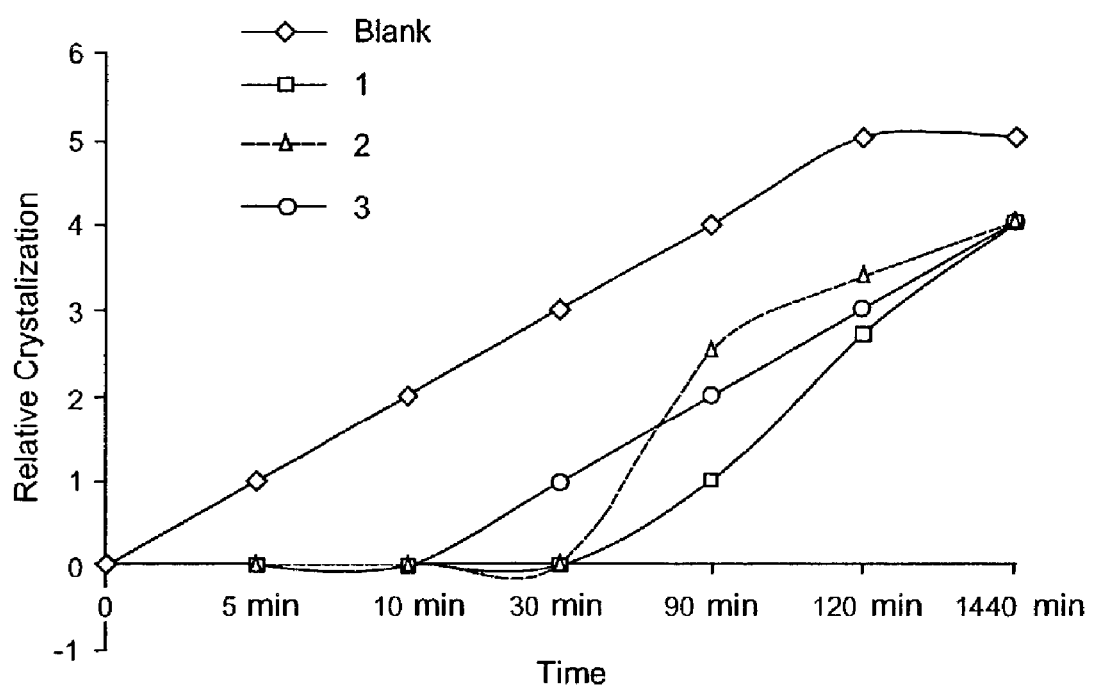
FIG. 2 shows the effects of inhibitors on nucleation time.

The solutions used in Example 1 were placed in a 200° F. (93° C.) constant temperature water bath and allowed to thermally equilibrate prior to mixing. After mixing, the solutions were kept in the water bath for an additional 30 minutes. The mixtures were removed, and placed at room temperature. The samples were observed at regular intervals for evidence of precipitation (FIG. 2). In the Figure, Inhibitor #1 is NA Minus 55 (Clearwater, Inc.; Houston, Tex.), Inhibitor #2 is an experimental salt inhibitor (Donlar Corporation; Bedford Park, Ill.), and Inhibitor #3 is NA Minus 55 (3801 experimental variation of NA Minus 55; Clearwater, Inc.; Houston, Tex.). The presence of inhibitors delayed the onset of crystal nucleation.

EXAMPLE 3

Tube Blocking Test

Figure 3:
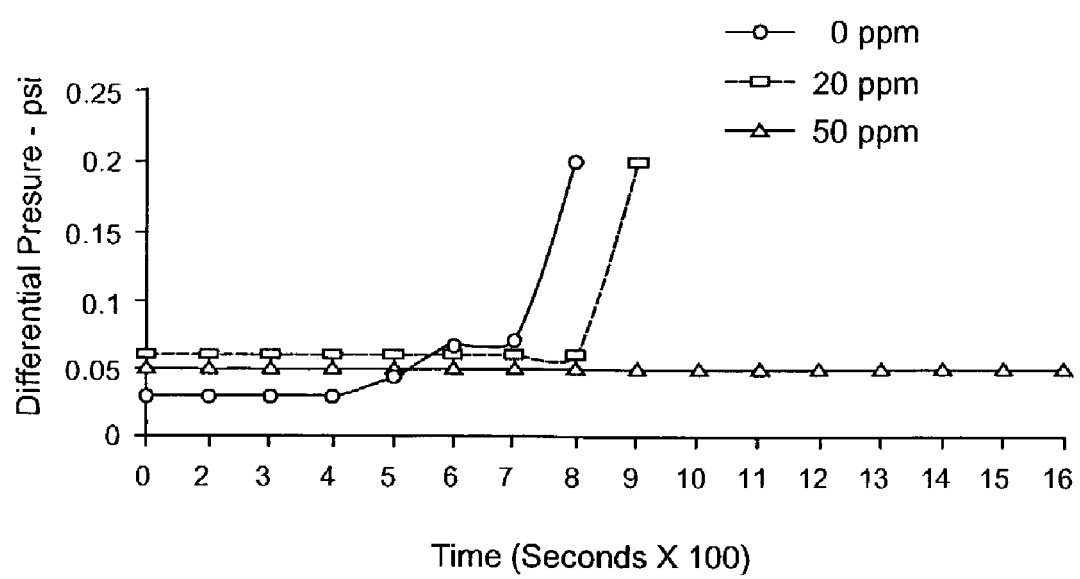
FIG. 3 illustrates a tube blocking test plot of differential pressure (y axis) against time (x axis).

Solutions were prepared at varying inhibitor concentrations as described in Example 1, using NA Minus 55 as the salt inhibitor. The solutions were placed in a 190° F. (88° C.) constant temperature water bath and allowed to thermally equilibrate. The solutions were introduced into a mixing "tee" using peristaltic pumps. The mixed solution was then pumped into a five foot (1.5 meter) long ⅛ inch (0.3 cm) stainless steel tube which was also immersed in the water bath. The mixed solution next entered a test coil consisting of one meter of 0.02 inch (0.05 cm) PEEK tubing immersed in a 40° F. (4° C.) thermostatically controlled cooling bath. The outlet temperature of the test coil was measured to be 43–45° F. (6–7° C.) throughout the test. The threshold treatment level for inhibition of this brine was found to be about 50 ppm. A plot of the differential pressure against time is shown in FIG. 3. At 20 ppm, the onset of pressure increase was delayed, and at 50 ppm, the pressure remained constant over the entire period of the experiment.

EXAMPLE 4

Reducing Wash Water Usage in a Well

A well was completed at a depth of about 9,000 feet (2743 meters). The formation water contained chloride ions in excess of 200,000 ppm (near saturation). Salt bridging of the tubing was problematic, and treatment with substantial volumes of water was required. Nitrilotriacetamide hydrochloride salt (trade name NA Minus 55; Clearwater, Inc., Houston, Tex.) was added to a reduced amount of injection water, resulting in control of salt bridging. Treatment levels were optimized for inhibition instead of dilution once the control was achieved.

EXAMPLE 5

Inhibition of Deposits During Production

An inhibitor such as nitrilotriacetamide or its salts can be added continuously to a wellbore using a suitable fluid pump. An effective continuous technique is injection using a chemical treating string or capillary tube to the bottom of the well. Alternatively, continuous addition could be performed down the annulus with a production slipstream.

EXAMPLE 6

Application with a Heavy Brine Foamer

Wells drilled into a reservoir in East Texas produce gas, a very heavy brine, and little or no liquid hydrocarbons. As production proceeds, heavy brine accumulates in the wellbore and eventually "drowns" the well. The gas produced tends to remove water vapor, further concentrating the brine.

Traditionally, foam sticks were added when production decreased. Water treatments were often required to remove salt deposits. After treatment, the well must be flushed with nitrogen to remove water and to restore gas production. This cycle of blockage and water treatment was repeated often.

A capillary treating string was installed inside the production tubing. An aqueous mixture of nitrilotriacetamide hydrochloride salt and a heavy brine foamer (mixture of cationic and amphoteric surfactants; BJ Unichem RNB-08126, BJ Services, Houston, Tex.) was continuously added at a rate of about two gallons per day. The foamer allowed for continuous unloading of produced water from the well. The salt inhibitor prevented formation of salt blocks that had previously restricted gas production flow. The well has not required water cleaning treatment for over one year, and has maintained commercially viable production rates. An added benefit is that operating costs decreased due to elimination of the downtime associated with water treatments.

EXAMPLE 7

Application with Fracturing Fluids

Foam fracturing methods were used on an older gas-producing field in the Mid-Continent area of the United States. Acceptable results were obtained, but production rates lasted only about 2 to 3 weeks before formation of salt deposits reduced flow rates to unacceptable levels. Water washes were successful at removing solid deposits, but solids soon developed again. Water treatments were required every two weeks.

Laboratory tests showed that the produced water was not saturated with sodium chloride. It was assumed that gas production was stripping away water vapor and caused the water to become saturated with salt.

Nitrilotriacetamide hydrochloride salt was added at two points during the stimulation treatment in order to place the inhibitor in the reservoir rock, providing a prolonged period of inhibitor protection. While normal fracturing treatment lasted about 2 to 3 weeks, treatment with inhibitor provided at least 9 months of satisfactory production. No water treatments have been required during this time.

EXAMPLE 8

Application in Offshore Well

An offshore oil well in the Gulf of Mexico was producing approximately 10,000 barrels of oil and 1,000 to 3,000 barrels of water per day. The water produced was super saturated with respect to sodium chloride. A temperature change occurred at the bottom of the well, severely reducing the flow of fluids from the well. This reduction was believed to be caused by the precipitation of sodium chloride in the well. It was necessary to wash the well with water every three days to maintain production.

The well was treated by injecting 12 drums (660 gallons, 2498 liters) of nitrilotriacetamide salt inhibitor dissolved in a 2% solution of potassium chloride into the formation. The 12 drums were dispersed into a total of 29,000 gallons (109,777 liters) of treating fluid. After treatment, the well produced at 9,000 to 10,000 barrels of oil per day for approximately 45 days without washing with water.

EXAMPLE 9

Application in Land-Based Gas Wells

Normal average production of a gas well in East Texas was about 100 MCF after normal foam fracturing. The well was fractured using a gelled fracturing fluid with 600 gallons of nitrilotriacetamide salt inhibitor. After foam fracturing with the salt inhibitor, the well produced at a rate of 214 MCF. This well has produced without the necessity of washing with fresh water since the inhibitor treatment.

EXAMPLE 10

Continuous Application of Inhibitor in Land-Based Gas Wells

A number of gas wells in the Kansas, Oklahoma Panhandle were treated with nitrilotriacetamide salt inhibitor. The inhibitor was added down the annulus of the well on a continuous basis. The inhibitor was added either alone, or blended with a foaming agent. If used alone, the inhibitor was used at a rate of one half gallon per day (1.9 liter per day). If used with a foamer, the inhibitor was used at a rate of one gallon per day (3.8 liter per day).

One particular well required flushing with fresh water every fifteen days to maintain acceptable levels of production. The gas production average was 31.3 thousand cubic feet per day (MCHD) over a sixty day period. After initiating continuous injection of the salt inhibitor down the annulus, production has averaged 49.6 MCFD (about 1.6 times the previous average production).

EXAMPLE 7

Continuous Application of Inhibitor with a Heavy Brine Foaming Agent

A well was treated with foam sticks and over a sixty day period of time showed a gradual decrease in production and had an average daily production rate of 219 MCF. After continuous injection of nitrilotriacetamide salt inhibitor containing a heavy brine foamer, the average production rate increased to 524 MCF without any decrease over time.

All of the compositions and/or methods and/or processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and/or apparatus and/or processes and in the steps or in the sequence of steps of the methods described herein without departing from the concept and scope of the invention. More specifically, it will be apparent that certain agents which are chemically related may be substituted for the agents described herein while the same or similar results would be achieved. All such similar substitutes and modifications apparent to those skilled in the art are deemed to be within the scope and concept of the invention.

The invention claimed is:

1. A method of reducing the amount of crystallized salt in an oil and/or gas well, the method comprising:
    selecting an oil and/or gas well containing crystallized salt;
    providing a fluid comprising water and a salt inhibitor selected from the group consisting of nitrilotriacetamide and a nitrilotriacetamide salt; and
    pumping the fluid into the well;
    wherein the amount of crystallized salt is reduced.

2. The method of claim 1, wherein the nitrilotriacetamide salt is a hydrochloric acid salt or a sulfuric acid salt.

3. The method of claim 1, wherein the concentration of the inhibitor is about 40 ppm to about 400 ppm.

4. The method of claim 1, wherein the fluid further comprises a surfactant.

5. The method of claim 1, wherein the fluid further comprises a foaming agent.

6. The method of claim 5, wherein the foaming agent is nonyl phenol ethoxylates, sulfamic acid derivatives of ethoxylated alcohols, ammonium dodecylbenzenesulfonate, or potassium dodecylbenzenesulfonate.

7. The method of claim 1, wherein the pumping step comprises continuous addition of fluid into the wellbore.

8. The method of claim 1, further comprising a step of pumping water into the well prior to pumping the fluid into the well.

9. A method of reducing the amount of crystallized salt in an oil and/or gas well, the method comprising:
    selecting an oil and/or gas well containing crystallized salt;
    providing a fluid comprising water, a salt inhibitor selected from the group consisting of nitrilotriacetamide and a nitrilotriacetamide salt, and a foaming agent selected from the group consisting of nonyl phenol ethoxylates, sulfamic acid derivatives of ethoxylated alcohols, ammonium dodecylbenzenesulfonate, and potassium dodecylbenzenesulfonate; and
    pumping the fluid into the well;
    wherein the amount of crystallized salt is reduced.

10. The method of claim 9, wherein the nitrilotriacetamide salt is a hydrochloric acid salt or a sulfuric acid salt.

11. The method of claim 9, wherein the concentration of the inhibitor is about 40 ppm to about 400 ppm.

12. The method of claim 9, wherein the fluid further comprises a surfactant.

13. The method of claim 9, wherein the pumping step comprises continuous addition of fluid into the wellbore.

14. The method of claim 9, further comprising a step of pumping water into the well prior to pumping the fluid into the well.

* * * * *